United States Patent
Hayashi et al.

(10) Patent No.: US 10,442,428 B2
(45) Date of Patent: Oct. 15, 2019

(54) VEHICLE CONTROL SYSTEM

(71) Applicant: DENSO CORPORATION, Kariya, Aichi-pref. (JP)

(72) Inventors: Koji Hayashi, Kariya (JP); Takatoshi Tosa, Kariya (JP); Yohei Masui, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/037,419

(22) Filed: Jul. 17, 2018

(65) Prior Publication Data
US 2019/0023270 A1 Jan. 24, 2019

(30) Foreign Application Priority Data

Jul. 18, 2017 (JP) .................. 2017-138759

(51) Int. Cl.
*B60W 30/08* (2012.01)
*B60W 30/12* (2006.01)
(Continued)

(52) U.S. Cl.
CPC .......... *B60W 30/08* (2013.01); *B60W 30/085* (2013.01); *B60W 30/09* (2013.01);
(Continued)

(58) Field of Classification Search
CPC .......... G08G 1/16; G08G 1/163; G08G 1/166; G08G 1/167; G08G 1/10; B60W 30/16;
(Continued)

(56) References Cited

U.S. PATENT DOCUMENTS 9,633,564 B2 * 4/2017 Ferguson .............. G08G 1/166
2003/0105578 A1 6/2003 Takenaga et al.
(Continued)

FOREIGN PATENT DOCUMENTS

| JP | 2003-168197 A | 6/2003 |
| JP | 2011-152865 A | 8/2011 |
| JP | 2012-014553 A | 1/2012 |
| WO | 2014/038076 A1 | 8/2016 |

*Primary Examiner* — Van T Trieu
(74) *Attorney, Agent, or Firm* — Knobbe, Martens, Olson & Bear, LLP

(57) ABSTRACT

A vehicle control system mounted in a vehicle, including a plurality of sensor devices each configured to perform at least one of detection of behaviors of the vehicle and detection of an object around the vehicle with predetermined detection timing and a vehicle control apparatus configured to perform driving aid control of the vehicle based on detection information detected by the plurality of sensor devices. The plurality of sensor devices include a first sensor device and second sensor devices other than the first sensor device. The first sensor device is configured to, with transmission timing of first detection information detected by the first sensor device, group the first detection information and second detection information acquired from the respective second sensor devices with the predetermined detection timing of the first sensor device and transmit the first and second detection information grouped together to the vehicle control apparatus.

7 Claims, 5 Drawing Sheets

(51) Int. Cl.
*B60W 30/085* (2012.01)
*B60W 30/09* (2012.01)
*G01S 7/41* (2006.01)
*G01S 13/93* (2006.01)

(52) U.S. Cl.
CPC ....... *B60W 30/12* (2013.01); *B60W 2550/308* (2013.01); *B60W 2750/308* (2013.01); *G01S 7/411* (2013.01); *G01S 13/931* (2013.01); *G01S 2013/9364* (2013.01); *G01S 2013/9367* (2013.01); *G01S 2013/9385* (2013.01)

(58) Field of Classification Search
CPC .... B60W 30/08; B60W 30/085; B60W 30/09; B60W 30/095; B60W 2750/308; B60R 2021/0002; B60R 2021/0027
See application file for complete search history.

(56) References Cited

U.S. PATENT DOCUMENTS

| | | | |
|---|---|---|---|
| 2008/0088707 A1* | 4/2008 | Iwaki | G01S 13/931 348/208.1 |
| 2010/0265101 A1 | 10/2010 | Takenaga et al. | |
| 2013/0282236 A1* | 10/2013 | Kato | G08G 1/163 701/36 |
| 2014/0219510 A1* | 8/2014 | Nagaoka | B60W 30/09 382/104 |
| 2015/0175162 A1 | 6/2015 | Nakadori | |
| 2017/0021835 A1* | 1/2017 | Kojima | G07C 5/02 |
| 2018/0281791 A1* | 10/2018 | Fukaya | B60W 40/04 |

\* cited by examiner

VEHICLE CONTROL SYSTEM

CROSS-REFERENCE TO RELATED APPLICATION

This application is based on and claims the benefit of priority from earlier Japanese Patent Application No. 2017-138759 filed on Jul. 18, 2017, the description of which is incorporated herein by reference.

BACKGROUND

Technical Field

This disclosure relates to a vehicle control system.

Related Art

Conventionally, several driving aid techniques, such as adaptive cruise control (ACC) and lane keeping assist (LKA), are known. To implement such driving aid techniques, a plurality of sensors are mounted in a vehicle. The vehicle carrying the sensors is referred to as an own vehicle. The plurality of sensors may include a sensor to detect objects around the own vehicle and a sensor to detect behaviors of the own vehicle. There may be shifts in the timing of data acquisition between these sensors. These shifts may impact the diving aid control.

Several methods for enabling data synchronization have been proposed. For example, in a vehicle surroundings monitoring apparatus disclosed in Japanese Patent Application Laid-Open Publication No. 2012-14553, a camera and a radar, as sensors for detecting objects around the own vehicle, are mounted in the own vehicle. The radar acquires the imaging timing of the camera and estimates an amount of movement from the imaging timing of the camera to the acquisition timing of radar information. A position and size of an object acquired by the radar is corrected according to the timing of imaging of the camera, thereby improving the matching accuracy between the camera image and the radar information.

In the surroundings monitoring apparatus disclosed in Japanese Patent Application Laid-Open Publication No. 2012-14553, the radar acquires the imaging timing of the camera, calculates a time shift between the imaging timing of the camera and the object detection time of the radar, and estimates an amount of movement of the object for the time shift, thereby correcting a position and size of the object. However, this configuration may increase the computational complexity and load.

In view of the above, it is desired to have a vehicle control system that can properly perform vehicle control using detection information from a plurality of sensors while simplifying the system configuration.

SUMMARY

One aspect of the disclosure provides a vehicle control system mounted in a vehicle, including: a plurality of sensor devices, each of which is configured to perform at least one of detection of behaviors of the vehicle and detection of an object around the vehicle with predetermined detection timing and transmit detection information; and a vehicle control apparatus configured to perform driving aid control of the vehicle based on the detection information detected by the plurality of sensor devices. The vehicle control apparatus is communicably connected to the plurality of sensor devices. In the vehicle control system, the plurality of sensor devices include a first sensor device and second sensor devices that are the plurality of sensor devices other than the first sensor device. The first sensor device is configured to, with transmission timing of first detection information detected by the first sensor device, group the first detection information and second detection information acquired from the respective second sensor devices with the predetermined detection timing of the first sensor device and transmit the first and second detection information grouped together to the vehicle control apparatus.

In the above configuration, each of the plurality of sensor devices is configured to perform at least one of detection of behaviors of the vehicle and detection of an object around the vehicle. The vehicle control apparatus is configured to, based on the detection information detected by the respective sensor devices, perform driving aid control of the vehicle. In such a configuration, the driving aid control is performed based on the detection information detected at proximate detection times such that there is no time shift in the detection information from the plurality of the sensor devices.

In this configuration, the first sensor device, among the plurality of sensor devices, groups the first detection information and the second detection information of the second sensor devices with the detection timing of the first sensor device and transmits the grouped first and second detection information to the vehicle control apparatus. Based on the grouped first and second detection information, the vehicle control apparatus performs driving aid control of the vehicle. Such a simple configuration that the first detection information of the first sensor device and the second detection information of the second sensor devices are grouped together to be transmitted allows for properly performing the driving aid control based on the detection information detected at proximate detection times.

DESCRIPTION OF SPECIFIC EMBODIMENTS

Hereinafter, exemplary embodiments of the present disclosure will be described in detail with reference to the accompanying drawings.

Figure 1:
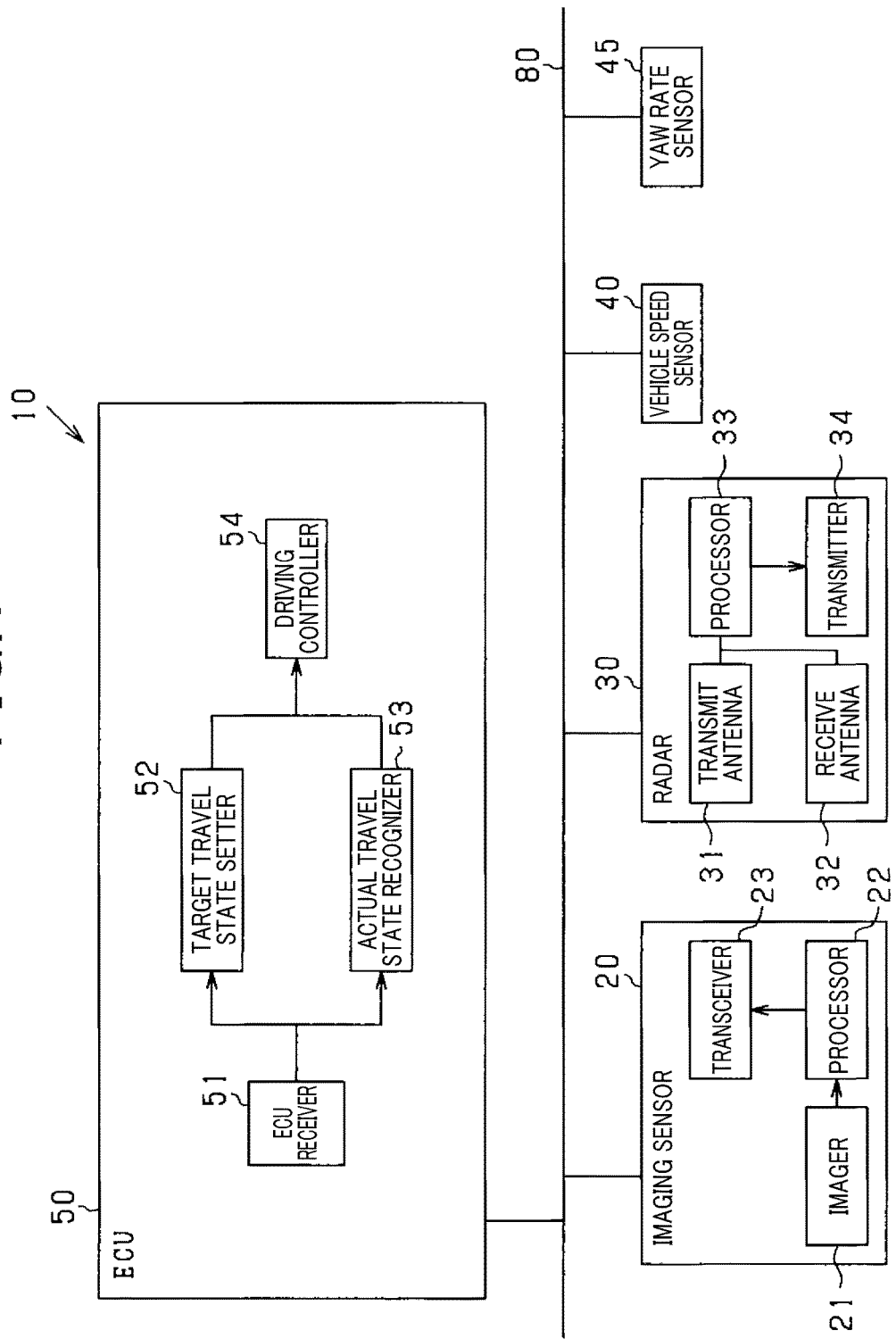
FIG. 1 is a block diagram of a vehicle control system in accordance with own embodiment of the present disclosure.

A vehicle control system 10 in accordance with one embodiment of the present disclosure will now be described with reference to FIG. 1. The vehicle control system 10 includes an imaging sensor 20 and a radar 30, as sensors to detect surroundings around the own vehicle MA. The vehicle control system 10 further includes a vehicle speed sensor 40 and a yaw rate sensor 45, as sensors to detect behaviors of the own vehicle MA. These sensors 20, 30, 40, and 45 are communicably connected to an electronic control unit (ECU) 50 via a controller area network (CAN) 80.

The imaging sensor 20 includes an imager 21, a processor 22, and a transceiver 23. In FIG. 1, the processor 22 and the transceiver 23 are represented by functional blocks, functions of which are implemented by at least one computer formed of a central processing unit (CPU), a random access memory (RAM), a read-only member (ROM), an input/output (I/O) interface and other components, executing computer programs stored in the ROM or the like. The processor 22 and the transceiver 23 may at least partially be implemented by a common computer or may be implemented by individual computers that are communicably connected to each other.

The imager 21 may be an imaging element, such as a complementary metal-oxide semiconductor (CMOS) or a charge-coupled device (CCD), a monocular camera or a stereoscopic camera. The imager 21 may be disposed, for example, near a lateral center of an upper edge of a windshield of the own vehicle MA to capture images of an area that spans a pre-defined angular range horizontally with respect to a forward direction with predetermined detection timing. Captured images are output to the processor 22.

The processor 22 detects a forward object from image data acquired from the imager 21. For example, the processor 22 compares forward image with preregistered object models, thereby detecting a forward object. The object models are prepared for respective types of objects, such as a vehicle, a pedestrian, a bicycle, a roadside object or the like, and respective features of the objects. A type and feature of an object included in the forward image are compared with the object models to identify the object. A relative distance between the identified object and the own vehicle MA is also detected. The processor 22 may further determine locations of demarcation lines, such as white lines or the like, by applying a well-known method, such as edge detection or the like, to the image data acquired from the imager 21. A processing result of the processor 22 is output to the transceiver 23.

The transceiver 23 receives second detection information LD, SD, YD from the radar 30, the vehicle speed sensor 40, and the yaw rate sensor 45, respectively. The transceiver 23, as described later, transmits the second detection information LD, SD, YD and the processing result of the processor 22, as grouped (or mutually associated) detection information TD, to the ECU 50 via the CAN 80.

The radar 30 emits radar waves, such as millimeter waves, laser waves, or ultrasonic waves, and receives their reflected radar waves from an object. Based on an amount of time from emission of a transmit wave to receipt of its reflected wave, the radar 30 calculates a distance from the own vehicle MA to the object. A direction (or an azimuth) of the object relative to the own vehicle MA is determined from a receipt direction or a phase difference of the reflected waves. The calculated distance and direction of the object allow for determining a position of the object, that is, a relative position of the object to the own vehicle MA. The radar 30 further calculates a relative speed of the object to the own vehicle MA from variations in reflected wave frequency due to the Doppler effect.

The radar 30 includes a transmit antenna 31, a receive antenna 32, a processor 33, and a transmitter 34. In FIG. 1, the processor 33 and the transmitter 34 are represented by functional blocks, functions of which are implemented by at least one computer formed of a central processing unit (CPU), a random access memory (RAM), a read-only member (ROM), an input/output (I/O) interface and other components, executing computer programs stored in the ROM or the like. The processor 33 and the transmitter 34 may at least partially be implemented by a common computer or may be implemented by individual computers that are communicably connected to each other.

The transmit antenna 31 emits the radar waves in a forward direction of the own vehicle MA to scan an area that spans a pre-defined angular range horizontally with respect to a light axis, and receives reflected radar waves from an object via the receive antenna 32. The processor 33 processes the reflected radar waves received via the receive antenna 32 to calculate a relative position and a relative speed of the object relative to the own vehicle MA, thereby providing detection information LD. The transmitter 34 transmits the detection information LD of the radar 30 to the imaging sensor 20 and the ECU 50 via the CAN 80.

The vehicle speed sensor 40 is configured to detect a speed of the own vehicle MA. The vehicle speed sensor 40 may be provided for a wheel of the own vehicle MA or a drive shaft that rotates in unison with the wheel of the own vehicle MA and detect a rotational speed of the wheel. The vehicle speed sensor 40 calculates the rotational speed of the wheel or the speed of the own vehicle MA calculated based on the rotational speed of the wheel and transmits vehicle speed information (hereinafter referred to as detection information SD) including the speed of the own vehicle MA to the imaging sensor 20 and the ECU 50 via the CAN 80.

The yaw rate sensor 45 is configured to detect a yaw rate (i.e., an angular speed) around a vertical axis passing though the center of mass of the own vehicle MA. A gyro sensor may be used as the yaw rate sensor 45. The yaw rate sensor 45 transmits yaw rate information (hereinafter referred to as detection information YD) including the yaw rate of the own vehicle MA to the imaging sensor 20 and the ECU 50.

The ECU 50 includes an ECU receiver 51, a target travel state setter 52, an actual travel state recognizer 53, and a driving controller 54. Functions of these elements are implemented by at least one computer formed of a central processing unit (CPU), a random access memory (RAM), a read-only member (ROM), an input/output (I/O) interface and other components, executing computer programs stored in the ROM or the like. The ECU receiver 51, the target travel state setter 52, the actual travel state recognizer 53, and the driving controller 54 may at least partially be implemented by a common computer or may be implemented by individual computers that are communicably connected to each other.

The ECU receiver 51 receives the grouped detection information TD from the imaging sensor 20. The ECU receiver 51 serially receives the detection information LD, YD, SD from the respective sensors 30, 40, 45. The ECU receiver 51 transmits the grouped detection information TD to the target travel state setter 52 and transmits ungrouped second detection information LD, YD, SD to the actual travel state recognizer 53.

Figure 2:
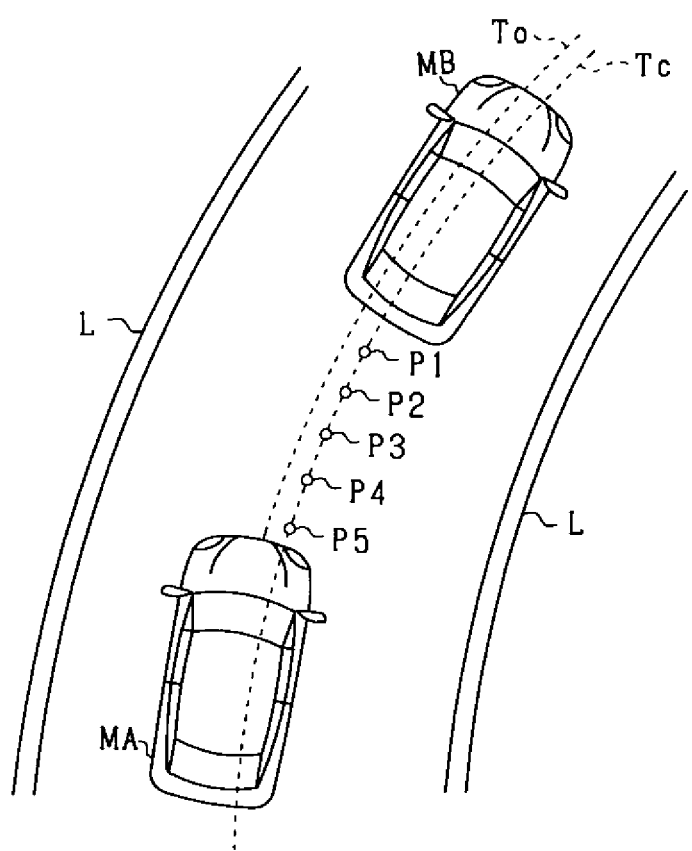
FIG. 2 is an example of recognizing a travel path of an own vehicle from a travel history of a preceding vehicle.

Based on the grouped detection information TD received from the imaging sensor 20, the target travel state setter 52 sets a target travel path as a target travel state. More specifically, as shown in FIG. 2, based on the detection information from each of the imaging sensor 20 and the radar 30, the target travel state setter 52 integrates information of the object. The information of the object includes a type, a relative position, a relative speed and the like of the object. Using a well-known method, from the integrated information of the object, the target travel state setter 52 selects a preceding vehicle MB that is traveling forward of the own vehicle MA and can be followed by the own vehicle MA. Based on a positional history P1-P5 of the preceding vehicle MB, the target travel state setter 52 calculates a travel trajectory Tc of the preceding vehicle MB. Based on the vehicle speed detected by the vehicle speed sensor 40 and the yaw rate detected by the yaw rate sensor 45, the target travel state setter 52 calculates a curvature of the roadway on which the own vehicle MA is traveling. Based on the travel trajectory Tc of the preceding vehicle MB and the curvature of the roadway on which the own vehicle MA, the target travel state setter 52 sets the target travel path To.

Based on the detection information LD, SD, YD transmitted directly from the sensors 30, 40, 45 to the ECU 50, the actual travel state recognizer 53 recognizes an actual behavior of the own vehicle as an actual travel state. More specifically, based on the detection information SD, YD of the vehicle speed sensor 40 and the yaw rate sensor 45, the actual travel state recognizer 53 recognizes a speed and a yaw rate of the own vehicle MA as an actual behavior.

Based on the target travel path To set by the target travel state setter 52 and the actual behavior of the own vehicle MA recognized by the actual travel state recognizer 53, the driving controller 54 manipulates the speed and the turn angle of the own-vehicle, thereby controlling the travel state of the own vehicle.

The CAN 80 interconnects between the respective sensors 20, 30, 40, 45 and interconnects between the respective sensors 20, 30, 40, 45 and the ECU 50. The CAN 80 has a bus network topology as shown in FIG. 1. Upon the sensors 20, 30, 40, 45 transmitting data, at least one destination, possibly a plurality of designations, of the data may be designated.

The plurality of sensors 20, 30, 40, 45 perform at least one of detection of behaviors of the own vehicle MA and detection of objects around the own vehicle MA. The imaging sensor 20 serves as a first sensor device configured to receive the detection information LD, SD, YD from the other sensors 30, 40, 45, group the detection information LD, SD, YD and the processing result of the imaging sensor 20, and transmit the grouped detection information to the ECU 50. In addition, each of the plurality of sensors 20, 30, 40, 45, other than the imaging sensor 20, that is, each of the sensors 30, 40, 45 serves as a second sensor device. The transceiver 23 of the imaging sensor 20 groups the second detection information LD, SD, YD received from the second sensor devices 30, 40, 45 with the detection timing (that is, imaging timing CT) and the processing result (as first detection information) of the imaging sensor 20 to thereby generate the grouped detection information TD. This grouped detection information TD is used by the target travel state setter 52 of the ECU 50.

Figure 3:
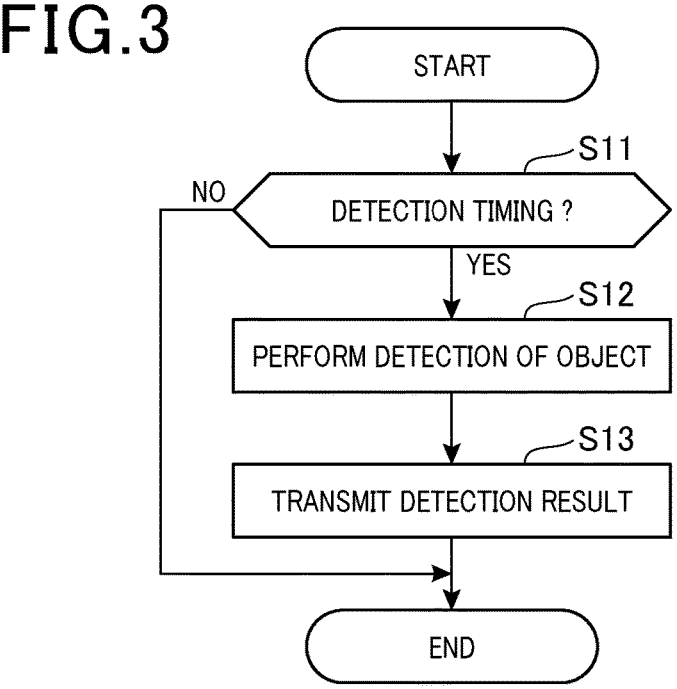
FIG. 3 is a flowchart illustrating steps of processing performed by a second sensor device.

A process procedure performed by each of the second sensor devices 30, 40, 45 will now be described with reference to FIG. 3. The process procedure for the radar 30 will herein be described while this process procedure is also applicable to the vehicle speed sensor 40 and the yaw rate sensor 45. The process flow of FIG. 3 is repeatedly performed every predetermined time interval for each of the radar 30, the vehicle speed sensor 40, and the yaw rate sensor 45.

At step S11, the radar 30 determines whether or not the detection timing has arrived.

If at step S11 it is determined that the detection timing has not yet arrived, then the process flow ends. If at step S11 it is determined that the detection timing has arrived, then at step S12 the radar 30 performs detection of an object and prepares transmission of the detection information LD. As to the vehicle speed sensor 40, it calculates a vehicle speed and prepares transmission of the detection information SD at step S12. As to the yaw rate sensor 45, it calculates a yaw rate and prepares transmission of the detection information YD. At step S13, the radar 30 transmits the detection information LD to the imaging sensor 20 and the ECU 50 with the transmission timing. Thereafter, the process flow ends.

In the radar 30, the transmission timing arrives every predetermined time interval, where a cyclic transmission period of the transmission timing is set equal to a cyclic detection period of the radar 30. In each of the vehicle speed sensor 40 and the yaw rate sensor 45, a cyclic transmission period is set less than the cyclic transmission period of the radar 30. The cyclic transmission period of the vehicle speed sensor 40 is set equal to the cyclic transmission period of the yaw rate sensor 45. The cyclic transmission period of each of the vehicle speed sensor 40 and the yaw rate sensor 45 is set greater than its cyclic detection period. In each of the vehicle speed sensor 40 and the yaw rate sensor 45, only the latest detection information is transmitted with the transmission timing.

Figure 4:
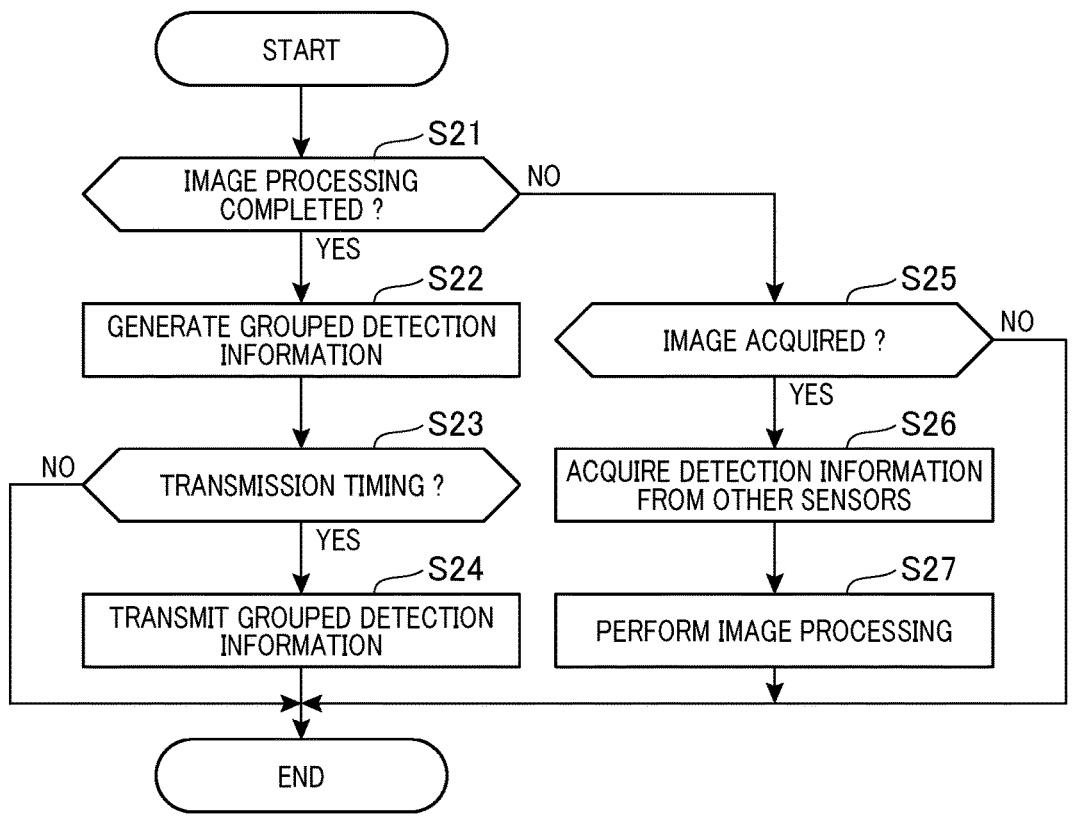
FIG. 4 is a flowchart illustrating steps of processing performed by an imaging sensor.

A process procedure of the imaging sensor 20 will now be described with reference to FIG. 4. The process flow of FIG. 4 is repeatedly performed every predetermined time interval.

At step S21, the imaging sensor 20 determines whether or not the image processing has been completed. If at step S21 it is determined that the image processing has been completed, the process flow proceeds to step S22.

If at step S21 it is determined that the image processing has not been completed, then at step S25 the imaging sensor 20 determines whether or not a forward image has been captured. If the imaging timing CT (that is, the detection timing) shown in FIG. 6 has arrived, then the answer is "YES" at step S25. If the imaging timing CT has not yet arrived, the process flow ends. The imager 21 captures a forward image every predetermined time interval.

If at step S25 the imaging timing CT has arrived, then at step S26 the imaging sensor 20 acquires the second detection information LD, YD, SD transmitted immediately therebefore from the radar 30, the vehicle speed sensor 40, and the yaw rate sensor 45, respectively. That is, the imaging sensor 20 retains the second detection information LD, SD, YD acquired with the imaging timing CT. At step S27, the imaging sensor 20 processes the captured image to detect an object.

If at step S21 it is determined that the image processing has been completed, then at step S22 the imaging sensor 20 groups the detection information LD, SD, YD acquired at step S26 and the processing result (that is, the first detection information) of the imaging sensor 20 to generate grouped detection information TD. At step S23, the imaging sensor 20 determines whether or not the transmission timing of the grouped detection information TD has arrived. The transmission timing arrives every predetermined time interval and a cyclic transmission period of the transmission timing is set equal to a cyclic imaging period of the imaging timing. If at step S23 it is determined that the transmission timing of the grouped detection information TD has arrived, then at step S24 the imaging sensor 20 transmits the grouped detection information TD to the ECU 50. Thereafter, the process flow ends.

Figure 5:
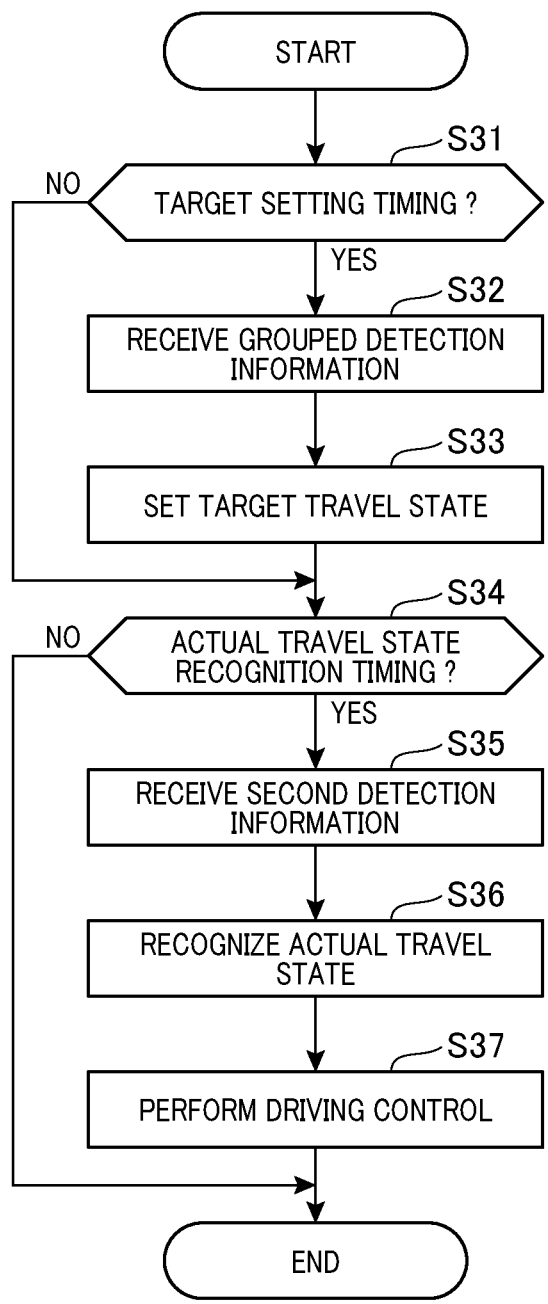
FIG. 5 is a flowchart illustrating steps of processing performed by an ECU.

A process procedure of the ECU 50 will now be described with reference to FIG. 5. The process flow of FIG. 5 is repeatedly performed every predetermined time interval.

At step S31, the ECU 50 determines whether or not the target setting timing has arrived. If at step S31 it is determined that the target setting timing has not yet arrived, then the process flow proceeds to step S34. If at step S31 it is determined that the target setting timing has arrived, then at step S32 the ECU 50 acquires the grouped detection information TD transmitted from the imaging sensor 20. A cyclic target setting period of the target setting timing is set equal to the cyclic transmission period of the grouped detection information TD. At step S33, the ECU 50 sets a target travel path To based on the grouped detection information TD.

At step S34, the ECU 50 determines whether or not the actual travel state recognition timing has arrived. If at step S34 it is determined that it the actual travel state recognition timing has not yet arrived, then process flow proceeds to step S35. If at step S34 it is determined that the actual travel state recognition timing has arrived, then at step S35 the ECU 50 acquires the second detection information LD, SD, YD transmitted from second sensor device 30, 40, 45, A cyclic period of the actual travel state recognition timing is set less than a cyclic period of the target setting timing. At step S36, the ECU 50 recognizes an actual travel state based on the second detection information LD, SD, YD. At step S37, the ECU 50 performs driving control based on the actual travel state and the target travel path To. Thereafter, the process flow ends.

Figure 6:
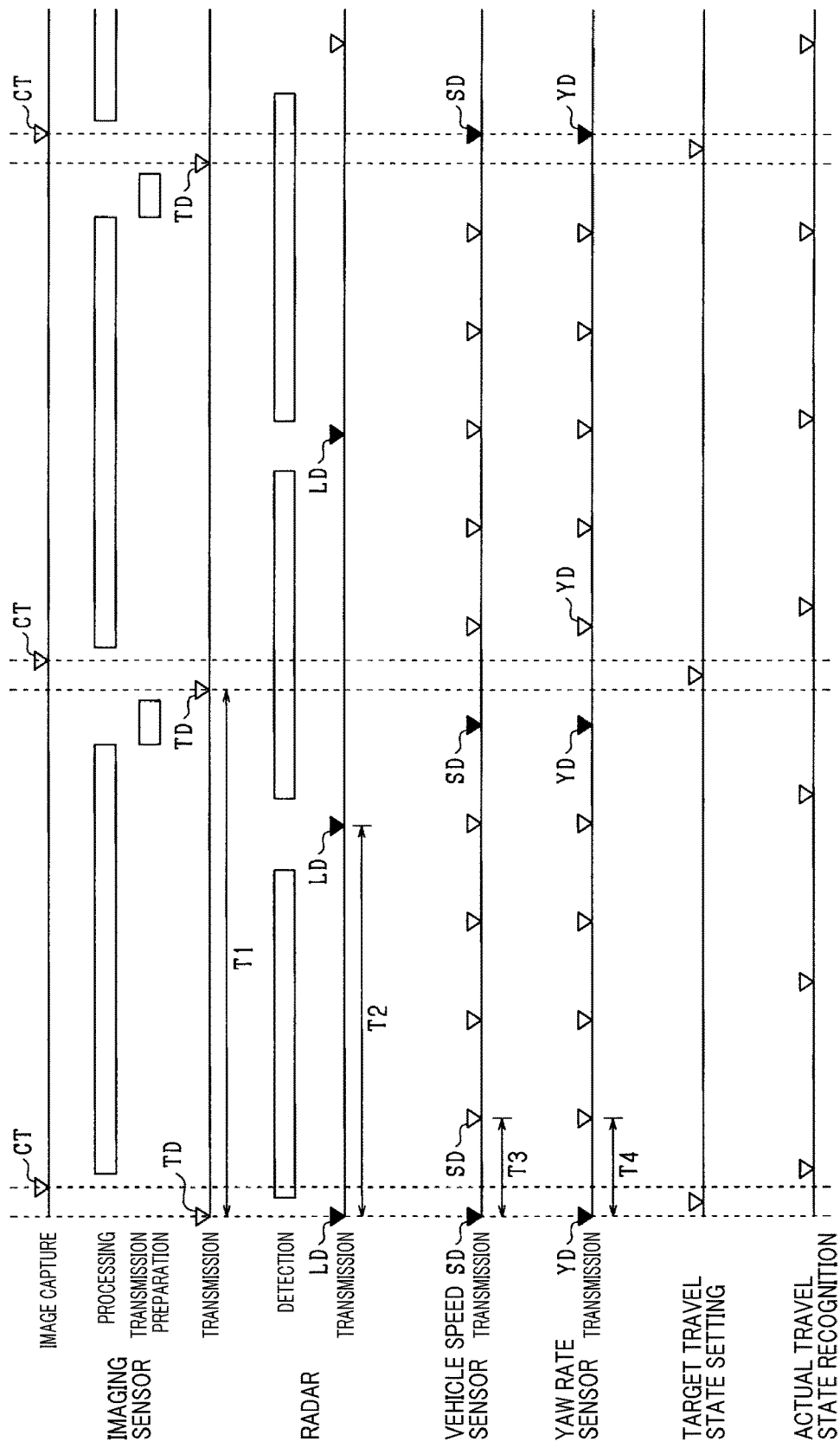
FIG. 6 is a timing diagram for the vehicle control system.

The operation of the present embodiment configured as above will now be described with reference to FIG. 6.

The imaging sensor 20 is designated as the first sensor device among the plurality of sensor devices 20, 30, 40, 45. The imaging sensor 20 groups the second detection information LD, SD, YD acquired from the respective second sensor devices 30, 40, 45 with the predetermined imaging timing CT (that is the latest detection information with respect to the imaging timing CT, indicated by upside-down filled triangles in FIG. 6) and the detection information (as the first detection information) of the imaging sensor 20, and transmits the grouped detection information to the ECU 50. The ECU 50 performs target generation processing based on the grouped detection information TD with the target travel state setting timing.

To set a target travel state of the own vehicle MA based on the detection information from the sensors 20, 30, 40, and 45, it should be emphasized that there is no time shift in the detection information from the sensors 20, 30, 40, and 45. Therefore, in the present embodiment, the detection information detected by the respective sensors 20, 30, 40, and 45 at their detection times proximate to each other is grouped together to generate grouped detection information TD. The grouped detection information TD is transmitted from the sensor 20 to the ECU 50. This grouped detection information TD is used to set a target travel state in the ECU 50.

A maximum error between the imaging timing CT and the transmission timing in each of the second sensor devices 30, 40, 45 is within the transmission period of each of the second sensor devices 30, 40, 45. Therefore, there is almost no timing error between the transmission timing of the detection information SD, YD, having a short cyclic transmission period, which represents behaviors of the own vehicle MA. With this configuration, using the grouped detection information TD to set a target travel state of the own vehicle MA allows for target travel state setting processing based on the detection information detected by the respective sensors 20, 30, 40, 45 at their detection times proximate to each other.

An actual travel state of the own vehicle changes as the behavior of the own vehicle or the status of surroundings of the own vehicle changes. Therefore, it is necessary to sequentially detect the actual travel state based on the second detection information LD, SD, YD transmitted from the respective second sensor devices 30, 40, 45. In the present embodiment, besides transmission of the grouped detection information TD from the imaging sensor 20 at the lowest frequency, the second detection information LD, SD, YD is transmitted from the respective second sensor devices 30, 40, 45, and an actual travel state is recognized based on the second detection information LD, SD, YD.

The image processing performed by the imaging sensor 20 may delay transmission of information from the imaging sensor 20. Thus, if the ECU 50 is configured to group the detection information (as the first detection information) of the imaging sensor 20 and the second detection information LD, SD, YD acquired from the respective second sensor device 30, 40, 45, there may be a large time shift between the first detection information and the second detection information LD, SD, YD. In view of the above, in the present embodiment, the second detection information LD, SD, YD acquired from the respective second sensor devices 30, 40, 45 with the imaging timing CT is grouped or associated with the first detection information that is a result of image processing by the imaging sensor 20, which can reduce the time shift between the first detection information and the second detection information LD, SD, YD.

If one of the sensor devices, having the shortest transmission period, is designated as the first sensor device, the second detection information may remain unchanged between the current and previous detection times of the first sensor device. In such a case, the first detection information of the first sensor device may be transmitted with the same second detection information of the second sensor devices as the second detection information transmitted at the previous transmission time of the first sensor device. That is, the same second detection information may be transmitted a plurality of times, which is significantly wasteful. In the present embodiment where the imaging sensor 20, which has the longest transmission period, is designated as the first sensor device, the second detection information LD, SD, YD acquired from the second sensor devices 30, 40, 45 with the imaging timing CT of the imaging sensor 20 is allowed to be always different than before.

Advantages

The present embodiment can provide the following advantages.

The imaging sensor 20 groups the first detection information of the imaging sensor 20 and the second detection information LD, SD, YD acquired from the respective second sensor devices 30, 40, 45 and transmits the grouped detection information to the ECU 50. The ECU 50 performs target generation processing (as driving aid control) based on the grouped detection information TD. Such a simple configuration that the first detection information of the imaging sensor 20 and the second detection information LD, SD, YD acquired from the respective second sensor devices 30, 40, 45 are grouped together to be transmitted allows for target travel state setting processing (as driving aid control) based on the detection information detected at proximate detection times.

In the present embodiment, taking into account a time delay that may be caused by the image processing performed by the imaging sensor 20, the second detection information LD, SD, YD acquired from the respective second sensor devices 30, 40, 45 with the imaging timing CT and the result of the image processing performed by the imaging sensor 20 are grouped together, which can reduce a time shift between the first and second detection information.

In the present embodiment, the imaging sensor 20 having the longest predetermined period is designated as the first sensor device, and the second detection information LD, SD, YD acquired from the second sensor devices 30, 40, 45 with the imaging timing CT of the imaging sensor 20 may always be different than before. With this configuration, the same second detection information does not have to be transmitted a plurality of times, which can reduce unnecessary communication.

The ECU 50 acquires the second detection information LD, SD, YD not only from the imaging sensor 20, but also from the second sensor devices 30, 40, 45. This configuration allows the vehicle control apparatus to sequentially acquire both the second detection information LD, SD, YD from the respective second sensor devices 30, 40, 45 in both grouped and ungrouped manners, regardless of the transmission period of the imaging sensor 20.

The ECU 50 is configured to set a target travel state of the own vehicle using the grouped detection information TD. This configuration allows for setting the target travel state simply based on the detection information detected at proximate detection times without grouping the detection information with reference to time stamps attached thereto. In addition, the ECU 50 is configured to recognize an actual travel state using the second detection information LD, SD, YD sequentially acquired from the respective second sensor device 30, 40, 45, which allows for accommodating changes in situation. As described above, the target travel state setting processing emphasizing that there is no time shift in the detection information from the sensors 20, 30, 40, 45 and the actual travel state recognition processing emphasizing the latest detection information, although both performed in the same ECU 50, require different detection information. In light of the above, in the present embodiment, the ECU 50 is allowed to perform the target travel state setting processing using the grouped detection information TD and perform the actual travel state recognition processing using the second detection information LD, SD, YD sequentially transmitted from the second sensor device 30, 40, 45.

In addition, detection of an object using the imaging sensor 20 and the radar 30 requires integration of object detection results of the imaging sensor 20 and the radar 30. This integration processing requires integration of the detection information CD, LD detected with matched detection timing. In the present embodiment, the imaging sensor 20 is therefore configured to previously group the detection information CD, LD detected with the matched detection timing. This configuration can eliminate steps of integration processing performed by the ECU 50.

Modifications

It is to be understood that the invention is not to be limited to the specific embodiment disclosed above and that modifications and other embodiments are intended to be included within the scope of the appended claims.

(M1) In the above embodiment, the imaging sensor 20 is designated as the first sensor device. In an alternative embodiment, another sensor may be designated as the first sensor device. For example, if, among the sensor devices, the radar has the longest detection period, then the radar may be designated as the first sensor device. Preferably, regardless of types of the sensor devices, the sensor device having the longest detection period may be designated as the first sensor device.

(M2) In the above embodiment, the sensor having the longest predetermined period is designated as the first sensor device. In an alternative embodiment, one of the sensor devices other than the sensor having the longest predetermined period may be designated as the first sensor device.

For example, the sensor having the shortest predetermined period may be designated as the first sensor device. In such an embodiment, the grouped detection information may be transmitted more frequently, whereby the detection information may be sequentially transmitted to the ECU 50 without the ungrouped detection information being directly transmitted from the respective sensor devices to the ECU 50.

(M3) In the above embodiment, the imaging sensor 20, as the first sensor device, is configured to perform image processing to detect an object. In an alternative embodiment, the imaging sensor 20 may be configured to, without performing the image processing, transmit image data to the ECU 50. The ECU 50 may be configured to process the image data received from the imaging sensor 20 to detect an object or perform edge detection or the like.

(M4) In the above embodiment, the detection timing and the transmission timing of each of the sensors 20, 30, 40, 45 are predetermined. In an alternative embodiment, each of the sensors 20, 30, 40, 45 may be configured to detect and transmit detection information immediately after completion of a previous processing stage.

(M5) In the above embodiment, the ECU 50 is configured to perform the actual travel state recognition processing using ungrouped detection information from the respective second sensor devices. In an alternative embodiment, the ECU 50 may be configured to perform the actual travel state recognition processing using the grouped detection information.

(M6) In the above embodiment, the imaging sensor 20 and the radar 30 are used as sensor devices for detecting an object. In an alternative embodiment, one of the imaging sensor 20 and the radar 30 may be used to detect an object. In another alternative embodiment, the imaging sensor 20, the radar 30, and another sensor device may be used to detect an object.

(M7) In the above embodiment, only the imaging sensor 20 is designated as the first sensor device. In an alternative embodiment, the imaging sensor 20 and another sensor device may be designated as first sensor devices. In such an embodiment, the ECU 50 may be configured to receive grouped detection information from a plurality of sensor devices as the first sensor devices.

(M8) In the above embodiment, the ECU 50 is configured to perform the integration processing to integrate the detection results of the imaging sensor 20 and the radar 30. In an alternative embodiment, the integration processing may be performed by one of the imaging sensor 20 and the radar 30. In such an embodiment, the grouped detection information may be transmitted from the one of the imaging sensor 20 and the radar 30 to the ECU 50.

(M9) In the above embodiment, the detection period and the transmission period of each of the vehicle speed sensor 40 are different from each other. In an alternative embodiment, the detection period and the transmission period of each of the vehicle speed sensor 40 may be equal to each other.

(M10) In the above embodiment, the cyclic period of the target setting timing is equal to the cyclic period of the transmission period of the grouped detection information TD. In an alternative embodiment, the cyclic period of the target setting timing may be different from the cyclic period of the transmission period of the grouped detection information TD.

(M11) In the above embodiment, the cyclic period of the actual travel state recognition timing is shorter than the cyclic period of the target setting timing. In an alternative embodiment, the cyclic period of the actual travel state recognition timing may be equal to the cyclic period of the target setting timing.

(M12) In the above embodiment, the detection information having no time stamp attached thereto is transmitted. In an alternative embodiment, the detection information having a time stamp attached thereto may be transmitted.

What is claimed is:

1. A vehicle control system mounted in a vehicle, comprising:
    a plurality of sensor devices, each of which is configured to perform at least one of detection of behaviors of the vehicle and detection of an object around the vehicle with predetermined detection timing and transmit detection information; and
    a vehicle control apparatus configured to perform driving aid control of the vehicle based on the detection information detected by the plurality of sensor devices, the apparatus being communicably connected to the plurality of sensor devices,
    wherein
    the plurality of sensor devices include a first sensor device and second sensor devices that are the plurality of sensor devices other than the first sensor device,
    the first sensor device is configured to, with transmission timing of first detection information detected by the first sensor device, group the first detection information and second detection information acquired from the respective second sensor devices with the predetermined detection timing of the first sensor device and transmit the first and second detection information grouped together to the vehicle control apparatus.

2. The system according to claim 1, wherein
    the first sensor device comprises a processor configured to perform processing of a detection result acquired with the detection timing of the first sensor device, and after completion of the processing and before transmitting a processing result as the first detection information to the vehicle control apparatus, group the processing result of the first sensor device and the second detection information acquired from the respective second sensor devices.

3. The system according to claim 1, wherein
    each of the plurality of sensor devices has a respective predetermined cyclic transmission period of transmission timing,
    one of the sensor devices that has the longest predetermined transmission period is designated as the first sensor device.

4. The system according to claim 1, wherein
    the vehicle control apparatus is configured to acquire the first detection information and the second detection information grouped together from the first sensor device, and acquire the second detection information transmitted directly from the respective second sensor devices.

5. The system according to claim 1, wherein
    each of the plurality of sensor devices has a respective predetermined cyclic transmission period of transmission timing,
    one of the sensor devices that has the longest predetermined transmission period is designated as the first sensor device,
    the vehicle control apparatus comprises:
    a receiver configured to receive the first detection information and the second detection information grouped together from the first sensor device, and receive the second detection information directly from the respective second sensor devices;
    a target travel state setter configured to set a target travel state of the vehicle based on the first detection information and the second detection information grouped together;
    an actual travel state recognizer configured to recognize an actual travel state of the vehicle based on the second detection information received directly from the second sensor devices, and a driving controller configured to, based the target travel state and the actual travel state, perform driving control of the vehicle.

6. The system according to claim 1, wherein
    the plurality of sensor devices include an imaging sensor and a radar both configured to perform detection of an object around the vehicle,
    one of the imaging sensor and the radar is designated as the first sensor device, and
    the detection information of the imaging sensor and the detection information of the radar grouped together in the first sensor device are integration processed to integrate an object detected by the imaging sensor and an object detected by a radar.

7. A vehicle control system mounted in a vehicle, comprising:
    a plurality of sensor devices, each of which is configured to detect at least one of behaviors of the vehicle and an object around the vehicle and transmit the detection information; and
    a vehicle control apparatus communicably connected to the plurality of sensor devices and configured to perform driving aid control of the vehicle based on the detection information,
    wherein
    the plurality of sensor devices include a first sensor device and a second sensor device, the first sensor device generating first detection information and the second sensor device generating second detection information,
    the first sensor device is configured to transmit the first detection information to the vehicle control apparatus, and
    the second sensor device is configured to transmit, in synchronization with a transmission timing of the first detection information, the second detection information to the vehicle control apparatus.

* * * * *